United States Patent Office 2,921,090
Patented Jan. 12, 1960

2,921,090
PRODUCTION OF SORBIC ACID

Edwin D. Parker and Alexander F. MacLean, Corpus Christi, Tex., assignors to Celanese Corporation of America, New York, N.Y., a corporation of Delaware No Drawing. Application March 8, 1955
Serial No. 493,066

13 Claims. (Cl. 260—526)

This invention relates to the production of sorbic acid and relates more particularly to the production of sorbic acid from 1,1,3,5-tetraalkoxyhexane.

It is an object of this invention to provide a new and efficient process for the production of sorbic acid from 1,1,3,5-tetraalkoxyhexane.

Other objects of this invention will be apparent from the following detailed description and claims.

In accordance with one aspect of this invention, 1,1,3,5-tetraalkoxyhexane is hydrolyzed to produce 3,5-dialkoxyhexanal which is then oxidized to form 3,5-dialkoxyhexanoic acid. Alternatively, the hydrolysis and oxidation steps may be performed simultaneously to yield the 3,5-dialkoxyhexanoic acid directly from the 1,1,3,5-tetraalkoxyhexane. The 3,5-dialkoxyhexanoic acid is then dealcoholated to produce sorbic acid. It is found that by proceeding in this manner relatively high yields of sorbic acid are obtained. In contrast, if the 1,1,3,5-tetraalkoxyhexane is first hydrolyzed and dealcoholated ot produce an unsaturated aldehyde, e.g. 5-alkoxy-2-hexenal or 2,4-hexadienal, and it is then attempted to oxidize such unsaturated aldehyde to the corresponding acid, e.g. to an alkoxy sorbic acid or to sorbic acid itself, the yield of the desired material is very much lower, since the unsaturated aldehydes mentioned above are found to be much more resistant to oxidation than the 3,5-dialkoxyhexanal.

The four alkoxy groups of the 1,1,3,5-tetraalkoxyhexane employed in the practice of this invention are preferably lower alkoxy groups, e.g. methoxy, ethoxy, propoxy or butoxy, although higher alkoxy groups, e.g. lauroxy, may be present if desired. The alkoxy groups may all be the same or a mixed alkoxy compound, for example 1,1-diethoxy-3,5-dimethoxyhexane, may be employed. Outstanding results have been obtained with 1,1,3,5-tetramethoxyhexane.

The hydrolysis of the 1,1,3,5-tetraalkoxyhexane is conveniently carried out by reacting said 1,1,3,5-tetraalkoxyhexane with water in the presence of an acid. Aqueous acetic acid is very suitable for this purpose. Other acids which may be used are formic acid, propionic acid, butyric acid, and resins containing carboxy substituents. The reaction may be carried out batchwise or continuously and the desired product, i.e. the 3,5-dialkoxyhexanal, may be separated from the reaction mixture by distillation.

Advantageously the oxidation of the 3,5-dialkoxyhexanal is accomplished by the use of air or other oxygen-containing gas in the presence of an oxidation catalyst such as a metal capable of existing in a plurality of valences, e.g. cobalt or manganese, or a compound of such a metal, such as manganese acetate, cobalt naphthenate, or a manganese or cobalt salt of a 3,5-dialkoxyhexanoic acid, and preferably in the presence of an oxidation-resistant solvent such as acetic acid or formic acid.

However, as pointed out above, the 1,1,3,5-tetraalkoxyhexane may be hydrolyzed and oxidized simultaneously to produce the 3,5-dialkoxyhexanoic acid directly. In one convenient process for this purpose an oxygen-containing gas is passed through a solution of the 1,1,3,5-tetraalkoxyhexane in an oxidation resistant solvent, e.g. acetic acid, containing a minor amount of water and an oxidation catalyst, such as a manganese or cobalt compound. If desired an oxidation promoter, such as acetaldehyde, may be added to the reaction mixture. When this combined oxidation and hydlolysis is used the desired product, i.e. the 3,5-dialkoxyhexanoic acid, is more easily and efficiently isolated, by distillation, from the reaction mixture than when the previously described two-stage process is employed.

The dealcoholation of the 3,5-dialkoxyhexanoic acid is preferably carried out by heating said acid in the presence of a basic catalyst. Aqueous sodium hydroxide is very suitable for this purpose. Examples of other catalysts are potassium hydroxide, lithium hydroxide, calcium hydroxide or barium hydroxide. Advantageously the dealcoholation reaction is effected in the liquid phase, the alcohol thus produced being distilled off during or after the reaction.

The following examples are given to illustrate this invention further. All proportions are by weight unless otherwise indicated.

Example I

A solution in acetic acid containing 24% of 1,1,3,5-tetramethoxyhexane, 7.4% of water and 0.037% of manganese, in the form of manganous acetate, is treated by bubbling through said solution a stream of oxygen at a rate of two moles of oxygen per hour per mole of 1,1,3,5-tetramethoxyhexane, for 4½ hours during which the temperature is maintained between 60 and 90° C. By distillation of the reaction mixture there is isolated a 3,5-dimethoxyhexanoic acid cut, boiling at 120° C. at a pressure ranging from 1.5 mm. Hg absolute to 0.5 mm. Hg absolute ($n_D^{20}$ 1.4383, neutral equivalent 174). The extent of conversion of the 1,1,3,5-tetramethoxyhexane is 86% and the efficiency of conversion of this material to 3,5-dimethoxyhexanoic acid is 87%.

The 3,5-dimethoxyhexanoic acid thus obtained is refluxed, at atmospheric pressure, with three times its weight of a 25% aqueous solution of sodium hydroxide for 2½ hours. The methanol thus produced is distilled off and the solution is cooled to precipitate crystals of sodium sorbate. The crystals are filtered off, washed with methanol, then dried and dissolved in 3½ times their weight of water. The resulting aqueous solution is acidified with dilute sulfuric acid to a pH of 3.1 to produce a precipitate of sorbic acid, which is obtained in high yield.

Example II

A solution in acetic acid containing 40% of 1,1,3,5-tetramethoxyhexane, 10% of water, 2% of acetaldehyde and 0.06% of manganese, in the form of manganous acetate, is treated by passing through said solution a stream of oxygen at the rate of two moles of oxygen per hour per mole of 1,1,3,5-tetramethoxyhexane for 70 minutes at a temperature of 70 to 93° C. The extent of conversion of the 1,1,3,5-tetramethoxyhexane is 63% and the efficiency of conversion of this material to 3,5-dimethoxyhexanoic acid ($n_D^{20}$ 1.4382, neutral equivalent 180) is 96%.

Example III 94 parts of 1,1,3,5-tetramethoxyhexane is mixed with 100 parts of a 10% aqueous solution of acetic acid and the resulting mixture is passed continuously through a reactor where it is maintained at a temperature of 95° C. The residence time of the mixture in the reactor is 30 minutes. The stream of reaction mixture coming from the reactor is passed continuously into the intermediate portion of a distillation column, maintained at a pressure of 100 mm. Hg absolute, the overhead temperature of the column being 50° C. and its base temperature 145° C. Water, methanol and acetic acid are removed from the top of the column, while a mixture containing unreacted 1,1,3,5-tetramethoxyhexane and 3,5-dimethoxyhexanal is removed from the base of the column. The extent of conversion of the 1,1,3,5-tetramethoxyhexane is 90%, the efficiency of conversion of this material to aldehydes being 91%.

The 3,5-dimethoxyhexanal thus obtained is isolated (B.P. 99–103° C. at 20 mm. Hg abs., $n_D^{20}$ 1.4260) and dissolved in glacial acetic acid to produce a 25% solution, to which 0.03% of manganese, as manganous acetate are added. Oxygen is bubbled through this solution at the rate of 0.6 mole of oxygen per hour per mole of 3,5-dimethoxyhexanal. Although no external heat is applied the temperature of the solution rises to a maximum of 90° C. 20 minutes after the start of the oxygen treatment. After 40 minutes the reaction is substantially complete as indicated by decrease in reaction temperature, but the flow of oxygen is continued for a total of 1½ hours. 3,5-dimethoxyhexanoic acid is separated from the reaction mixture by distillation. The extent of conversion of the 3,5-dimethoxyhexanal is 86% and the efficiency of conversion of this material to 3,5-dimethoxyhexanoic acid is 84%.

It is to be understood that the foregoing detailed description is merely given by way of illustration and that many variations may be made therein without departing from the spirit of our invention.

Having described our invention what we desire to secure by Letters Patent is:

1. Process for the production of sorbic acid which comprises hydrolyzing and oxidizing 1,1,3,5-tetraalkoxyhexane to produce 3,5-dialkoxyhexanoic acid and dealcoholating said 3,5-dialkoxyhexanoic acid to form sorbic acid.

2. Process as set forth in claim 1 in which said dealcoholation is carried out in the liquid phase.

3. Process as set forth in claim 1 in which said dealcoholation is carried out in the presence of an inorganic base.

4. Process for the production of sorbic acid which comprises hydrolyzing and oxidizing 1,1,3,5-tetramethoxyhexane to produce 3,5-dimethoxyhexanoic acid and dealcoholating said 3,5-dimethoxyhexanoic acid to form sorbic acid.

5. Process as set form in claim 4 in which said dealcoholation is carried out in the liquid phase.

6. Process which comprises passing an oxygen-containing gas through a solution of 1,1,3,5-tetraalkoxyhexane in aqueous acetic acid to oxidize and hydrolyze said 1,1,3,5-tetraalkoxyhexane to produce 3,5-dialkoxyhexanoic acid.

7. Process which comprises passing an oxygen-containing gas through a solution of 1,1,3,5-tetramethoxyhexane in aqueous acetic acid containing a minor amount of water in the presence of an oxidation catalyst to oxidize and hydrolyze said 1,1,3,5-tetramethoxyhexane to produce 3,5-dimethoxyhexanoic acid, said solution being maintained at a temperature between about 60° and 90° C.

8. Process as set forth in claim 7 in which the oxidation catalyst comprises a compound of a metal selected from the group consisting of manganese and cobalt.

9. Process as set forth in claim 8 in which the solution contains acetaldehyde as an oxidation promoter.

10. Process which comprises passing an oxygen-containing gas through a solution of 1,1,3,5-tetramethoxyhexane in aqueous acetic acid in the presence of an oxidation catalyst containing a metal capable of existing in a plurality of valences to oxidize and hydrolyze said 1,1,3,5-tetramethoxyhexane to produce 3,5-dimethoxyhexanoic acid and dealcoholating said 3,5-dimethoxyhexanoic acid to form sorbic acid.

11. Process as set forth in claim 10 in which said dealcoholation is carried out in the presence of aqueous sodium hydroxide.

12. Process which comprises heating a 3,5-dialkoxyhexanoic acid with aqueous alkali to dealcoholate said acid and form sorbic acid.

13. Process which comprises heating 3,5-dimethoxyhexanoic acid with aqueous sodium hydroxide to demethanolate said acid and form sorbic acid.

References Cited in the file of this patent

UNITED STATES PATENTS

| 2,393,737 | Bortnick | Jan. 29, 1946 |
| 2,583,112 | McKeever | Jan. 22, 1952 |

OTHER REFERENCES

Weygand: Organic Preparations (1945), p. 201.
Hoaglin et al.: Journal American Chemical Society 71, 3468–72 (1949).